Aug. 17, 1954

W. TAMMINGA 2,686,613

DISPENSER FOR SINGLE SERVICE MILK CANS

Original Filed Nov. 15, 1949

INVENTOR
*William Tamminga*
BY *Cornelius Fabriske*
ATTORNEY

Patented Aug. 17, 1954

2,686,613

UNITED STATES PATENT OFFICE 2,686,613

DISPENSER FOR SINGLE SERVICE MILK CANS

William Tamminga, Goshen, N. Y., assignor to Monitor Process Corporation, Jersey City, N. J., a corporation of New Jersey Original application November 15, 1949, Serial No. 127,389, now Patent No. 2,622,772, dated December 23, 1952. Divided and this application January 28, 1952, Serial No. 268,657

6 Claims. (Cl. 222—80)

This invention relates to the dispensing of milk from a bulk container into drinking glasses for individual consumption.

My prior Patent No. 2,186,083, dated January 9, 1940, illustrates an apparatus for dispensing milk from conventional milk delivery cans, for example, the 40 quart variety, the can being supported in upright position within a cabinet provided with dispensing mechanism through which milk may be drawn, at the will of the operator, into drinking glasses.

The apparatus of said patent is highly efficient in handling the dispensing of milk from a conventional milk delivery can and has gone into extensive use on land, but does not meet all the requirements of seagoing vessels. Such ships are frequently at sea for weeks at a time and, when conventional milk delivery cans are utilized in this commerce, the empty cans are in such bad condition at the end of a voyage that they very frequently have to be taken apart and entirely rebuilt and retinned due to rust and corrosion, because persons in charge of milk dispensing will not properly wash out and clean the cans after they have been emptied.

Consequently it has become the practice to package milk for seagoing vessels in five gallon cans, adapted for a single use. These cans are generally of rectangular form and are provided with a screw cap. They are shipped in filled condition and stored on the vessel under refrigerated conditions until use. The milk in the can is then manually poured into pitchers by removing the screw top and tilting the can and, when a can is empty, it is thrown overboard. The milk is poured from the pitcher into drinking glasses. This practice of serving milk is unsanitary and altogether undesirable and there has long been a definite need for some satisfactory dispensing unit whereby milk could be dispensed by the glassful directly from these five gallon containers while the milk remaining in the container is kept cool and palatable. The present invention provides a satisfactory solution of this problem.

In carrying out the present invention, I provide these rectangular single use cans with an additional screw cap outlet and locate such outlet at one corner of the top wall of the can and in this outlet I install a milk discharge tube, such as is disclosed in my Patent No. 2,186,083 aforesaid. The milk discharge tube is mounted in the can in a novel and efficient manner by a structural arrangement of very low cost, so as not to materially add to the cost of single service cans as previously constructed. In addition, I provide a dispensing cabinet to support the rectangular can in tilted, on edge, position in a refrigerating compartment of novel construction, hereinafter more fully described, so that the milk may be maintained in cool sanitary condition and dispensed from time to time into drinking glasses as in my said prior patent. Through the use of this invention, contamination of the milk is minimized and the serving of such milk in an efficient manner is made possible.

Features of the invention, other than those adverted to, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 1:
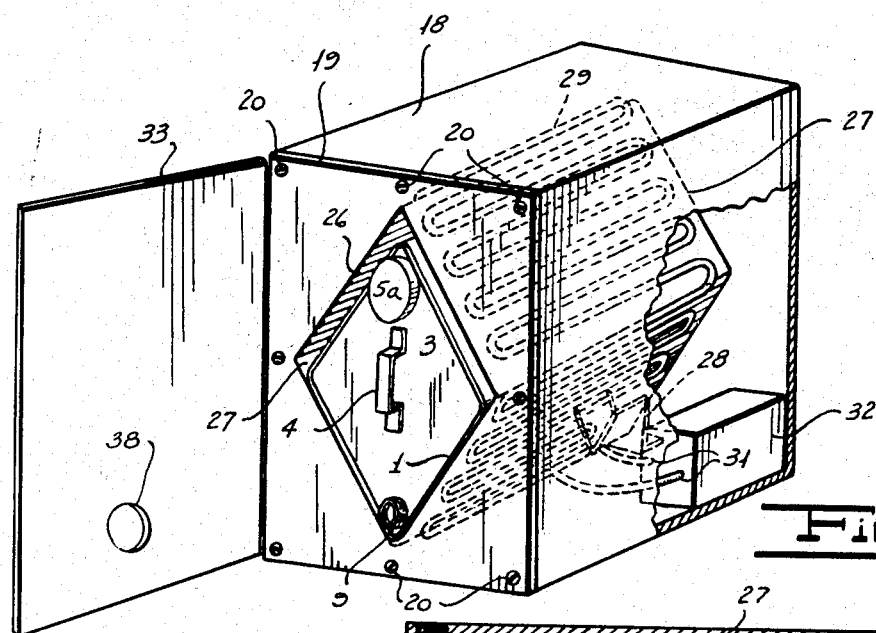
Fig. 1 shows a milk dispenser according to the present invention, illustrating a can in position therein. The figure is a perspective view with a portion of the outer casing and a portion of the door broken away in the interest of clearness.

The present invention comprises a novel refrigerated cabinet adapted to receive a novel form of single use can. In my parent application, Serial No. 127,389, now Patent No. 2,622,772, issued December 23, 1952, of which this application is a division, the can is shown and described in detail and repetition of such description is not considered necessary here.

Suffice it to point out that the can 1 is of rectangular form, all walls of the cabinet being of rectangular shape, and the top and bottom walls being preferably square. The top wall is designated 3 and is provided with a handle 4 whereby the can may be easily lifted and carried. In said top wall is also formed a filler opening normally sealed by a filler cap 5a. This filler opening is at one corner of the top wall 3, while at the opposite corner of such top wall is formed an outlet opening in which is supported a mounting cap 9 for a discharge tube 6, the details of which are disclosed in said parent patent. The tube 6 is longitudinally slidable through a rubber sealing ring within the cup and while this tube is normally pressed in a position wherein it is mainly contained within the can, it may be withdrawn as indicated in dotted lines in Figure 2.

Figure 2:
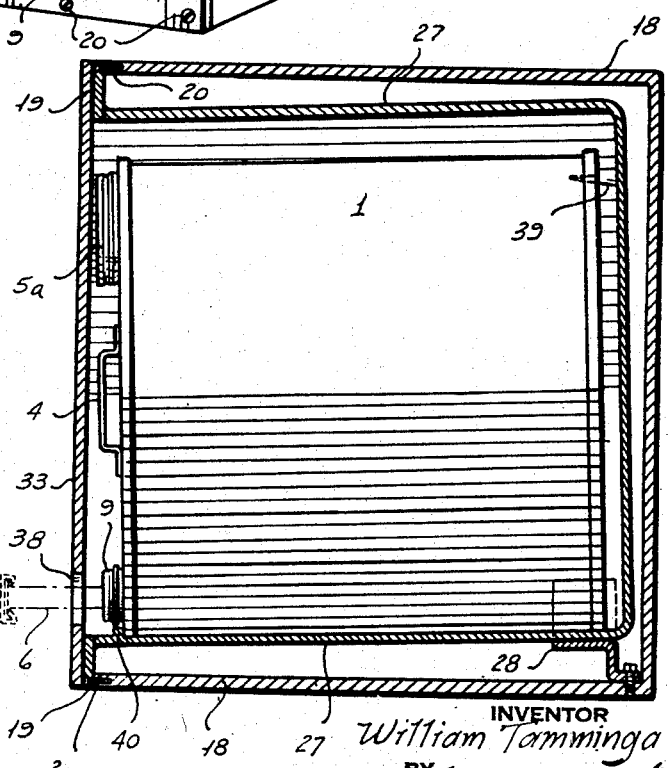
Fig. 2 is a longitudinal vertical section through the assembly of Figure 1.

When the milk is to be dispensed from a can so constituted, said can is removed from the usual refrigerated storage place and positioned in the cabinet shown in Figs. 1 and 2. This cabinet is illustrated in these figures, in the interest of simplicity, as having a single thickness outer wall 18, although, in practice, it is preferably of double walled construction with appropriate interposed insulation. The front of the casing of the cabinet is closed by a front panel 19 shown as held in place by screws 20. The central portion of this front panel is provided with a square opening 26 positioned with its sides at 45 degrees to the base of the casing. This opening is somewhat larger than the transverse dimensions of the can 1, so that a can may be readily passed through said opening when the can is tilted to substantially horizontal position.

Positioned within the casing and registering with the opening 26 is a walled pocket 27 of rectangular form closed on its four sides and at its back, but open at its front. This pocket is made of sheet metal welded, brazed or otherwise permanently attached to the front panel, the opening 26 of which forms the inlet to the pocket. The front of the pocket is thus supported by the front panel, but the rear end of the pocket may be supported on a bracket 28 secured to the bottom of the casing as shown in Fig. 2. The arrangement is such that the pocket inclines upwardly toward the rear of the casing, as illustrated in this latter figure, so that the can 1, positioned in the pocket as shown in Fig. 2, will be substantially horizontal, but will tilt toward the corner of the can where the discharge tube 6 is located.

Arranged within the casing and preferably mounted on the outer surface of the pocket 27, are a series of refrigerating coils 29. These may be arranged about all four sides of the pocket or along a lesser number of said sides. In any event, they are connected to terminal tubes 31 which lead to a control valve 32. This valve is in practice connected to the remaining parts of a refrigerating system which may, if desired, be enclosed within the casing 18 or within an appropriate subbase associated therewith. When a refrigerant is circulated through the coils 29, heat is withdrawn from the walls of the pocket 27 with resulting cooling or refrigeration of the milk in the can 1 in said pocket.

The front of the casing has a hinged door 33 on which is mounted dispensing mechanism of the character disclosed in my said Patent No. 2,186,083 and in said door is an opening 38 through which the discharge tube 6 may be withdrawn from the can 1 and secured to the dispensing mechanism on the door, whereby the slide valve of the discharge tube may be manipulated at the will of the operator to discharge milk through the discharge port 30 into a drinking glass positioned beneath the same.

In order to permit of satisfactory flow of milk from the can 1, it is essential that air be admitted to the can to displace the liquid drawn therethrough. Consequently, I mount on a rear wall of the pocket 27 a sharp spur 39, so located that it will engage with the bottom of the can near the upper corner thereof when the can is positioned in the pocket 27. As the can is forced rearwardly to a seat in the pocket, the bottom of the can will be impaled by the spur 39, which is preferably of arcuate or irregular cross section, so that the hole thereby punched in the bottom of the can will admit the inflow of air for the purpose stated. To insure proper positioning of the can in the pocket a stop 40 is located at the bottom of the pocket and near its forward end and the can should be forced into the pocket far enough for its lower corner to pass the stop 40 and rest against the inner side of the stop.

In associating the can with the casing, the front hinged door is opened, the can is forced back into the pocket until it is engaged with the stop 40. The tube 6 is then withdrawn into the position shown in dotted lines in Fig. 2. The door 33 is then closed, the tube is secured to the dispensing mechanism on the exterior of the door and all is then in readiness for the dispensing of milk. Meanwhile the milk in the can is kept cool by the refrigerating system which I have hereinbefore described.

When the contents of the can have been drawn off, the dispensing tube is disengaged from the dispensing mechanism on the door, the door is opened, the can lifted out and thrown overboard, and a full can substituted in the casing.

Milk handled in the manner stated and by the apparatus described is maintained in hygienic and sterile condition and at proper temperatures to insure palatability and freedom of contamination. The use of pitchers or other unsterilized containers is wholly unnecessary as the milk is deposited directly from the sterilized can through sterilized equipment to the drinking glass of the user. The cabinet and the dispensing mechanism thereof are such that no part thereof ever touches the milk. The refrigerating apparatus and the interior of the cabinet are sealed by the front plate against the entrance of dirt, moisture or other extraneous matter, so that no cleaning of the interior of the casing is required. The entire exterior of the casing and its door may be made from stainless steel or other sanitary material which gives a neat and pleasing appearance and provides no harbor for dirt which would render it unsightly or unsanitary.

The foregoing detailed description sets forth the invention in its preferred practical form, but the invention is to be understood as fully commensurate with the appended claims.

Having thus fully described the invention, what I claim as new and desire to secure by Letters Patent is:

1. In an assembly of the character described, a cabinet provided therein with a can receiving pocket of substantially rectangular transverse cross section with an open end at the front of the cabinet and extending rearwardly into the confines of the cabinet, said pocket being positioned with all of its front to rear walls arranged in inclined angular relation to the horizontal to receive and support a can in recumbent position with at least two adjacent side walls of the can in contact with the corresponding inclined walls of the pocket, and a door on the front of the cabinet provided with an aperture positioned to register with a discharge tube associated with the can at the lower front corner thereof for dispensing milk from the can.

2. An assembly according to claim 1 comprising: refrigerating coils within the cabinet exteriorly of the pocket.

3. An assembly according to claim 1 comprising: a perforated spur mounted in fixed rigid position and projecting into the confines of the pocket from the rear end thereof to engage with and perforate a can when the latter is forced against it into the pocket.

4. An assembly according to claim 1, wherein all of the front to rear walls of the pocket are at substantially 45 degrees to the horizontal.

5. In an assembly of the character described, a cabinet provided with a front plate having therein a rectangular diamond shaped opening the opposite edges of which are parallel to one another and are arranged at 90 degrees to the adjacent edges and all of which edges are in inclined angular relation to the horizontal, a rectangular pocket of corresponding cross section having an open front secured to the front plate in registration with the opening in the latter and adapted to receive a rectangular can to support the can in recumbent substantially horizontal position with two side walls of the can in contact with the corresponding side walls of the pocket, refrigerating coils associated with the wall of the pocket, and a door secured to the front of the casing for closing the opening in the front plate.

6. An assembly according to claim 5, wherein all of the edges of the diamond shaped opening in the front plate are inclined at substantially 45 degrees to the horizontal.

References Cited in the file of this patent

UNITED STATES PATENTS

| Number | Name | Date |
|---|---|---|
| 36,478 | Phelph | Sept. 16, 1862 |
| 2,246,693 | Ohme | June 24, 1941 |
| 2,291,256 | Rehrig et al. | July 28, 1942 |